US011566976B2

(12) United States Patent
Shibamoto et al.

(10) Patent No.: US 11,566,976 B2
(45) Date of Patent: Jan. 31, 2023

(54) GAS SUPPLY METHOD AND GAS SAMPLER

(71) Applicant: Shimadzu Corporation, Kyoto (JP)

(72) Inventors: Shigeaki Shibamoto, Kyoto (JP); Wenjian Lu, Kyoto (JP); Ayaka Sato, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 164 days.

(21) Appl. No.: 16/913,357

(22) Filed: Jun. 26, 2020

(65) Prior Publication Data

US 2021/0088421 A1 Mar. 25, 2021

(30) Foreign Application Priority Data

Sep. 24, 2019 (JP) .............................. JP2019-173302

(51) Int. Cl.
*G01N 30/02* (2006.01)
*G01N 1/22* (2006.01)
*G01N 30/32* (2006.01)

(52) U.S. Cl.
CPC ........... *G01N 1/2226* (2013.01); *G01N 30/32* (2013.01); *G01N 2030/025* (2013.01); *G01N 2030/324* (2013.01)

(58) Field of Classification Search
CPC ................. G01N 1/2226; G01N 30/32; G01N 2030/025; G01N 2030/324; G01N 2030/207
USPC ........ 422/89; 96/101–108; 73/863.02, 23.35, 73/23.36, 23.41, 23.42, 863.71, 864.83, 73/864.84
See application file for complete search history.

(56) References Cited

U.S. PATENT DOCUMENTS

2007/0075242 A1 4/2007 Kruis

FOREIGN PATENT DOCUMENTS

| CN | 108351329 | * | 7/2018 |
| EP | 1764603 | * | 3/2007 |
| JP | H10274644 A | | 10/1998 |
| JP | 2000146932 A | | 5/2000 |
| JP | 2015-190875 A | | 11/2015 |
| KR | 20170092723 | * | 8/2017 |

OTHER PUBLICATIONS

Japanese Office Action dated Dec. 6, 2022 for corresponding Japanese Patent Application No. 2019-173302.

* cited by examiner

*Primary Examiner* — Robert R Raevis
(74) *Attorney, Agent, or Firm* — Muir Patent Law, PLLC

(57) ABSTRACT

A gas sampler includes a connection portion connectable to an introduction piping connected to a sample tank, a switching valve for switching a connection state between the connection portion and a sample loop, a pump, and a control device. A buffer flow path between the sample loop and the pump is configured to be selectively connectable to any one of a plurality of buffer tanks different in volume. A volume of the buffer flow path is greater than a volume of the introduction piping by a predetermined amount. The control device operates the pump in a state in which the switching valve is in a closed state to set an inside of the buffer flow path to a negative pressure, and thereafter stops the pump and make the switching valve in an open state to fill the sample loop with a sample gas by using the negative pressure of the buffer flow path.

7 Claims, 7 Drawing Sheets

GAS SUPPLY METHOD AND GAS SAMPLER

CROSS-REFERENCE TO RELATED APPLICATIONS

This application claims priority under 35 U.S.C. § 119 to Japanese Patent Application No. 2019-173302 filed on Sep. 24, 2019, the entire disclosure of which is incorporated herein by reference in its entirety.

BACKGROUND OF THE INVENTION

Field of the Invention

The present disclosures relate to a method of supplying a sample gas to a column of a gas analyzer by using a gas sampler and also relates to a gas sampler for supplying a sample gas to a column of a gas analyzer.

Description of the Background Art

Generally, a gas analyzer such as a gas chromatograph is provided with a column for separating various components in a sample gas to be analyzed. To a column of the gas analyzer, a sample gas is supplied using a gas sampler. Normally, a gas sampler is provided with a sample loop of a constant volume and a switching valve for switching the connection destination of the sample loop. By appropriately switching the connection destination of the sample loop by the control of the switching valve, a gas sampler temporarily fills the sample loop with a sample gas supplied from a sample gas source, and thereafter supplies a certain amount of the sample gas filled in the sample loop to the column of the gas analyzer.

For example, Japanese Unexamined Patent Application Publication No. 2015-190875 discloses a technique of using a six-way valve as a switching valve of a gas sampler.

SUMMARY OF THE INVENTION

As a method of filling a sample loop with a sample gas from a sample gas source, it is assumed that the inside of the sample loop is set to a negative pressure (pressure lower than the atmospheric pressure) by using a pump and then a sample gas is caused to be sucked into the sample loop by using the negative pressure.

However, according to this method, it is concerned that when the volume of the sample loop is smaller than the volume of the introduction flow path between the sample gas source and the gas sampler, the sample gas will not be sufficiently sucked into the sample loop by simply setting the inside of the sample loop to a negative pressure, resulting in an insufficient amount of the sample gas to be supplied from the sample loop to the column. In particular, in a gas sampler for a micro gas chromatogram, since a volume of a sample loop is set to a very small value (e.g., about several hundred microliters), the volume of the sample loop tends to become smaller than the volume of the introduction piping, which causes the above-mentioned problems remarkably.

The present disclosure has been made to solve the above-mentioned problems, and an object of the present disclosure is to supply an appropriate amount of a sample gas to a column of a gas analyzer by using a gas sampler.

A gas supply method according to an embodiment of the present disclosure is a gas supply method for supplying a sample gas to a column of a gas analyzer by using a gas sampler. The gas sampler is provided with a connection portion connectable to a sample tank filled with the sample gas, a sample holding portion configured to hold the sample gas introduced from the sample tank to the connection portion, a switching valve configured to switch a connection state between the connection portion and the sample holding portion, and a suction pump connected to the sample holding portion via a buffer flow path. A volume of the buffer flow path is greater than a volume of an introduction flow path connecting between the sample tank and the connection portion. The gas supply method includes the steps of: adjusting a pressure of an inside of the buffer flow path to a negative pressure by operating the suction pump in a state in which the switching valve is in a closed state; introducing the sample gas from the sample tank to the sample holding portion via the connection portion by opening the switching valve with the suction pump being stopped, after the adjusting of the pressure.

A gas sampler according to an embodiment of the present disclosure is a gas sampler for supplying a sample gas to a column of a gas analysis device. The gas sample includes a connection portion connectable to a sample tank filled with the sample gas, a sample holding portion configured to hold the sample gas introduced to the connection portion from the sample tank, and a switching valve configured to switch a connection state between the connection portion and the sample holding portion, and a suction pump connected to the sample holding portion via a buffer flow path. A volume of the buffer flow path is greater than a volume of an introduction flow path connecting between the sample tank and the connection portion.

The above-described objects and other objects, features, aspects, and advantages of the present invention will become apparent from the following detailed descriptions of the invention that can be understood with reference to the attached drawings.

DESCRIPTION OF THE PREFERRED EMBODIMENT

Figure 1:
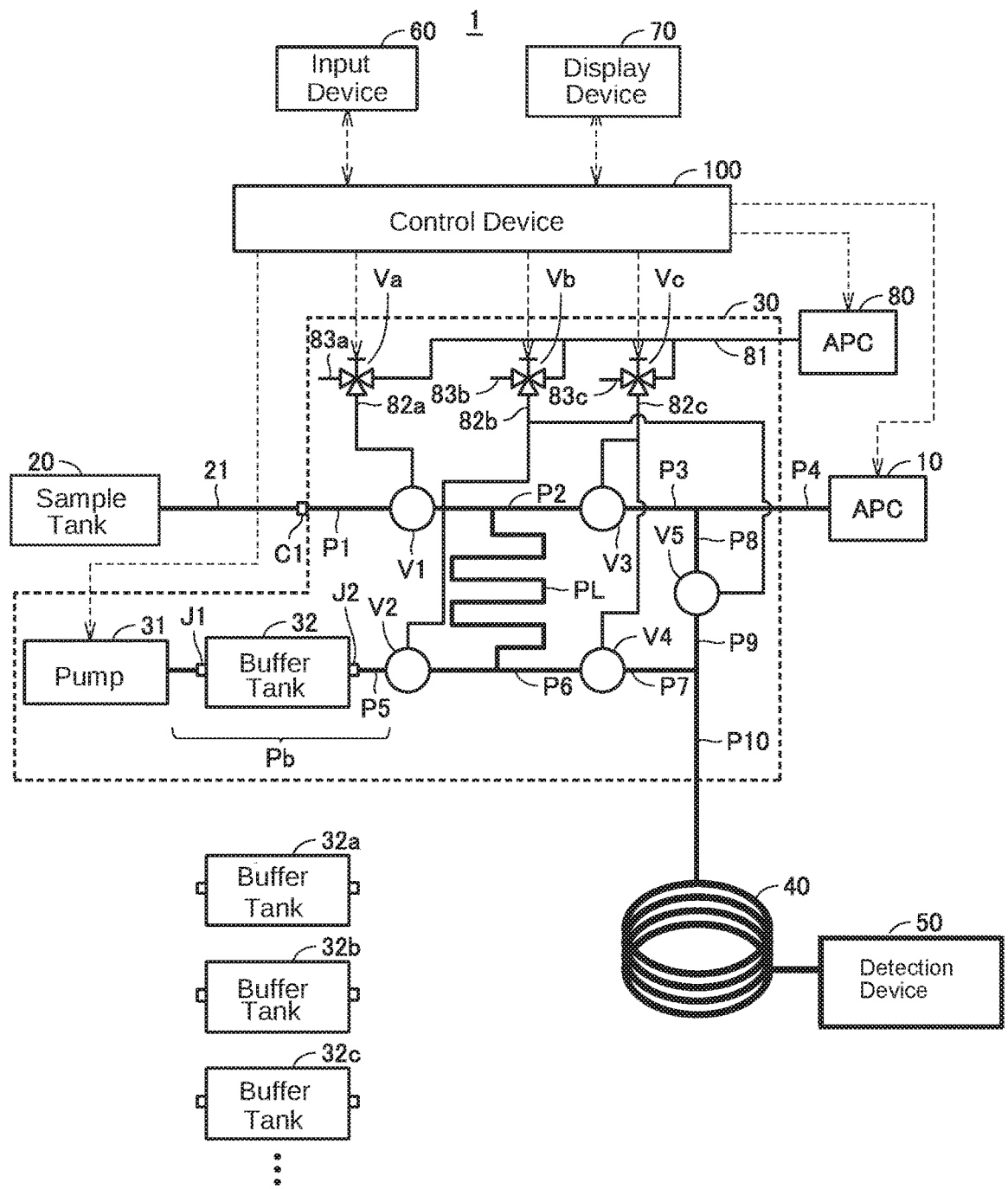
FIG. 1 is a diagram schematically showing an example of a configuration of a gas chromatograph.

Hereinafter, an embodiment of the present disclosure will be described in detail with reference to the attached drawings. In the drawings, the same or corresponding portions are denoted by the same reference numerals, and the description thereof will not be repeated.

Apparatus Configuration

FIG. 1 is a diagram schematically showing an example of a configuration of a gas chromatograph (gas analyzer) 1 including a gas sampler 30 according to this embodiment.

The gas chromatograph 1 is provided with electronic automatic pressure controllers (Automatic Pressure Controller, hereinafter referred to as "APC") 10 and 80, a sample tank 20, a gas sampler 30, a column 40, a detection device 50, a display device 70, an input device 60, and a control device 100.

The APC 10 adjusts a mobile phase called a carrier gas to a predetermined pressure and outputs it to a piping P4. The carrier gas outputted from the APC 10 to the piping P4 is supplied to the column 40 through the inside of the gas sampler 30. As a carrier gas, for example, a helium gas is used.

The sample tank 20 is a device for storing a sample gas to be analyzed. The sample tank 20 is connected to the connection portion C1 of the gas sampler 30 via an introduction piping 21. A user can change the sample gas to be analyzed by the gas chromatograph 1 by exchanging the sample tank 20 and the introduction piping 21 connected to the connection portion C1 of the gas sampler 30.

The gas sampler 30 is a device for supplying a sample gas to the column 40 by a fixed amount. The gas sampler 30 is provided with the connection portion C1, the sample loop PL of a constant volume, pipings P1 to P10, switching valves V1 to V5, the pump 31, and the buffer tank 32. The sample loop PL is an example of a sample holding portion.

The connection portion C1 is configured to be connectable to the introduction piping 21 connected to the sample tank 20. The piping P1 communicates between the connection portion C1 and the switching valve V1. The piping P2 communicates the switching valve V1 and the switching valve V3. The piping P3 communicates the switching valve V3 and the piping P4. The piping P5 communicates the pump 31 and the switching valve V2. The piping P6 communicates the switching valve V2 and the switching valve V4. The piping P7 communicates the switching valve V4 and the piping P10. The piping P8 communicates the piping P4 and the switching valve V5. The piping P9 communicates the switching valve V5 and the piping P10. The piping P10 communicates the piping P9 and the column 40. The piping P4 is branched into the piping P3 and the piping P8 in the gas sampler 30. The piping P7 and the piping P9 merge into the piping P10 within the gas sampler 30.

The sample loop PL is connected between the piping P2 and the piping P6. The sample loop PL has a function of temporarily holding a sample gas introduced from the sample tank 20 to supply the sample gas to the column 40.

The buffer tank 32 is connected to the piping P5. The buffer tank 32 is a buffer tank selected from the plurality of buffer tanks 32a, 32b, 32c, . . . different in volume and connected to the piping P5. That is, the piping P5 is configured to be interchangeably connectable to a buffer tank 32 selected from the plurality of different buffer tanks 32a, 32b, 32c, . . . different in volume. Specifically, the piping P5 is provided with connectors J1 and J2 which can selectively connect any one of the plurality of buffer tanks 32a, 32b, 32c, . . . . A user can change the volume of the flow path between the pump 31 and the sample loop PL, including the buffer tank 32 and the piping P5, by replacing the buffer tank 32 connected to the connectors J1 and J2. Hereinafter, the flow path including the buffer tank 32 and the piping P5 is also referred to as a "buffer flow path Pb".

The pump 31 is a suction pump for sucking out the air in the buffer flow path Pb to set the inside of the buffer flow path Pb to a negative pressure. Note that in this disclosure, the term "negative pressure" means a pressure lower than the atmospheric pressure with reference to the atmospheric pressure.

The switching valves V1 to V5 each are a pneumatic valve which is opened and closed by driving air. Therefore, the gas sampler 30 is equipped with control valves Va to Vc, control pipings 81, and 82a to 82c, and exhaust pipes 83a to 83c for controlling the driving air of switching the valves V1 to V5.

The switching valves V1 to V5 each are a so-called normally open-type valve, which is turned in an open state in the initial state in which no driving air is supplied and turned in a closed state when driving air is supplied. The switching valve V1 is communicated with the control valve Va via the control piping 82a, and is opened and closed depending on the presence or absence of driving air from the control valve Va. Similarly, the switching valves V2 and V5 are communicated with the control valve Vb via the control piping 82b, and are opened and closed depending on the presence or absence of driving air from the control valve Vb. The switching valves V3 and V4 are communicated with the control valve Vc via the control piping 82c, and are opened and closed depending on the presence or absence of driving air from the control valve Vc.

The APC 80 adjusts the driving air for controlling the switching valves V1 to V5 to a predetermined pressure and outputs the pressure to the control piping 81. The control valves Va to Vc each are a three-way solenoid valve controlled by a command signal from the control device 100.

When the control valve Va is controlled so as to communicate between the control piping 81 and the control piping 82a, the switching valve V1 becomes in a closed state because the driving air is supplied to the switching valve V1. As a result, the piping P1 and the piping P2 are disconnected. On the other hand, when the control valve Va is controlled so that the control piping 82a and the exhaust pipe 83a are communicated with each other, the driving air supplied to the switching valve V1 is discharged to the exhaust pipe 83a, so that the switching valve V1 becomes in an open state. As a result, the piping P1 and the piping P2 are communicated with each other.

When the control valve Vb is controlled so that the control piping 81 and the control piping 82b are communicated with each other, the driving air is supplied to the switching valves V2 and V5, so that the switching valves V2 and V5 become in a closed state. As a result, the piping P5 and the piping P6 are disconnected and the piping P8 and the piping P9 disconnected. On the other hand, when the control valve Vb is controlled so that the control piping 82b and the exhaust pipe 83b are communicated with each other, the driving air supplied to the switching valves V2 and V5 is discharged to the exhaust pipe 83b, so that the switching valves V2 and V5 become in an open state. As a result, the piping P5 and the piping P6 are communicated with each other and the piping P8 and the piping P9 are communicated with each other.

When the control valve Vc is controlled so that the control piping 81 and the control piping 82c are communicated with each other, the driving air is supplied to the switching valves V3 and V4, so that the switching valves V3 and the V4 become in a closed state. As a result, the piping P2 and the piping P3 are disconnected and the piping P6 and the piping P7 are disconnected. On the other hand, when the control valve Vc is controlled so that the control piping 82c and the exhaust pipe 83c are communicated with each other, the driving air supplied to the switching valves V3 and V4 is discharged to the exhaust pipe 83c, so that the switching valves V3 and V4 become in an open state. As a result, the piping P2 and the piping P3 are communicated with each other and the piping P6 and the piping P7 are communicated with each other.

By appropriately switching the connection destination of the sample loop PL by the control of the switching valves V1 to V5, the gas sampler 30 temporarily fills the sample loop PL with the sample gas supplied from the sample tank 20, and then supplies the sample gas filled in sample loop PL to the column 40. The method of supplying the sample gas to the column 40 by the gas sampler 30 will be described in detail later.

The column 40 separates various components in the sample gas supplied from the gas sampler 30. Specifically, while the sample gas supplied to the column 40 passes through the column 40 along with the flow of the carrier gas output from the APC10, various components contained in the sample gas are separated in the temporal direction. The components separated in the column 40 are introduced to the detection device 50 from the column 40.

The detection device 50 detects components introduced from the column 40. As the detection device 50, for example, an absorption photometric detector (PDA (Photo Diode Array) detector), a fluorescent detector, a differential refractive index detector, a conductivity detector, a mass spectrometer, or the like is used. The data indicating the detection result by the detection device 50 is stored in a memory in the control device 100 and is displayed on the display device 70 in accordance with the request from the user.

The input device 60 is a pointing device, such as, e.g., a keyboard and a mouse, that accepts commands from a user. The display device 70 is composed of, for example, a liquid crystal (LCD: Liquid Crystal Display) panel, and displays data for a user. In cases where a touch panel is used as a user interface, the input device 60 and the display device 70 are integrally formed.

The control device 100 includes a CPU (Central Processing Unit), a memory, an interface, etc., which are not shown. The control device 100 generally controls the entire gas chromatograph 1 including the pump 31, the APCs 10 and 80, and the switching valves V1 to V5 (control valves Va to Vc). The control device 100 is wired or wirelessly connected to the input device 60 and the display device 70 as user interfaces.

When supplying the sample gas from the gas sampler 30 to the column 40, the control device 100 controls the pump 31 and the switching valves V1 to V5 so that the sample gas supplied from the sample tank 20 is once filled in the sample loop PL, and thereafter the sample gas filled in the sample loop PL is supplied to the column 40.

In this embodiment, as a method of filling the sample loop PL with a sample gas, a method is employed in which the inside of the buffer flow path Pb and the sample loop PL is set to a negative pressure by using the pump 31 and the sample gas is sucked into the sample loop PL by using the negative pressure.

In this method, it is concerned that when the total volume of the buffer flow path Pb and the sample loop PL is smaller compared with the volume of the introduction piping 21 between the sample tank 20 and the connection portion C1 of the gas sampler 30, simply setting the inside of the buffer flow path Pb and the sample loop PL to a negative pressure will not result in sufficiently suction of the sample gas into the sample loop PL, which in turn cause a shortage of the amount of the sample gas supplied from the sample loop PL to the column 40.

Particularly, in cases where the gas sampler 30 is for a micro gas chromatogram, since the volume of the sample loop PL is set to a very small value (for example, about several hundred microliters), the total volume of the buffer flow path Pb and the sample loop PL tends to become smaller than the volume of the introduction piping 21, which in turn may cause the above-mentioned problems remarkably. Moreover, since the sample tank 20 and the introduction piping 21 are replaceable, the volume of the introduction piping 21 can vary. Therefore, it is desirable to adjust the volume of the buffer flow path Pb in accordance with the volume of the introduction piping 21.

Thus, in this embodiment, the piping P5 between the pump 31 and the sample loop PL is configured to be selectable to any one of the plurality of buffer tanks 32a, 32b, 32c, . . . different in volume. A user can make the volume of the buffer flow path Pb greater than the volume of the sample loop PL connected to the introduction piping 21 by a predetermined amount (e.g., the volume of the sample loop PL) in advance by replacing the buffer tank 32 to be connected to the piping P5 before filing the sample gas to the sample loop PL. This suppresses the shortage of the amount of the sample gas to be sucked into the sample loop PL.

Note that the terms "connection portion C1", "sample loop PL", "switching valve V1", "pump 31", "buffer flow path Pb", and "introduction piping 21" in this embodiment correspond to "connection portion", "sample holding portion", "switching valve", "suction pump", "buffer flow path", and "introduction flow path", respectively, in the present disclosure.

Supply Operation of Sample Gas

In this embodiment, the buffer tank 32 selected from the plurality of buffer tanks 32a, 32b, 32c, . . . is connected to the piping P5, so that the volume of the buffer flow path Pb becomes greater than the volume of the introduction piping 21 by a predetermined amount. In this state, the control device 100 temporarily fills the sample loop PL with the sample gas by executing the following negative pressure buffer processing, the sample filling processing, the sample supply processing in this order, and supplies the sample gas filled in the sample loop PL to the column 40.

First, the negative pressure buffer processing will be described. The negative pressure buffer processing is for setting the inside of the buffer flow path Pb and the sample loop PL to a negative pressure by using the pump 31.

Figure 2:
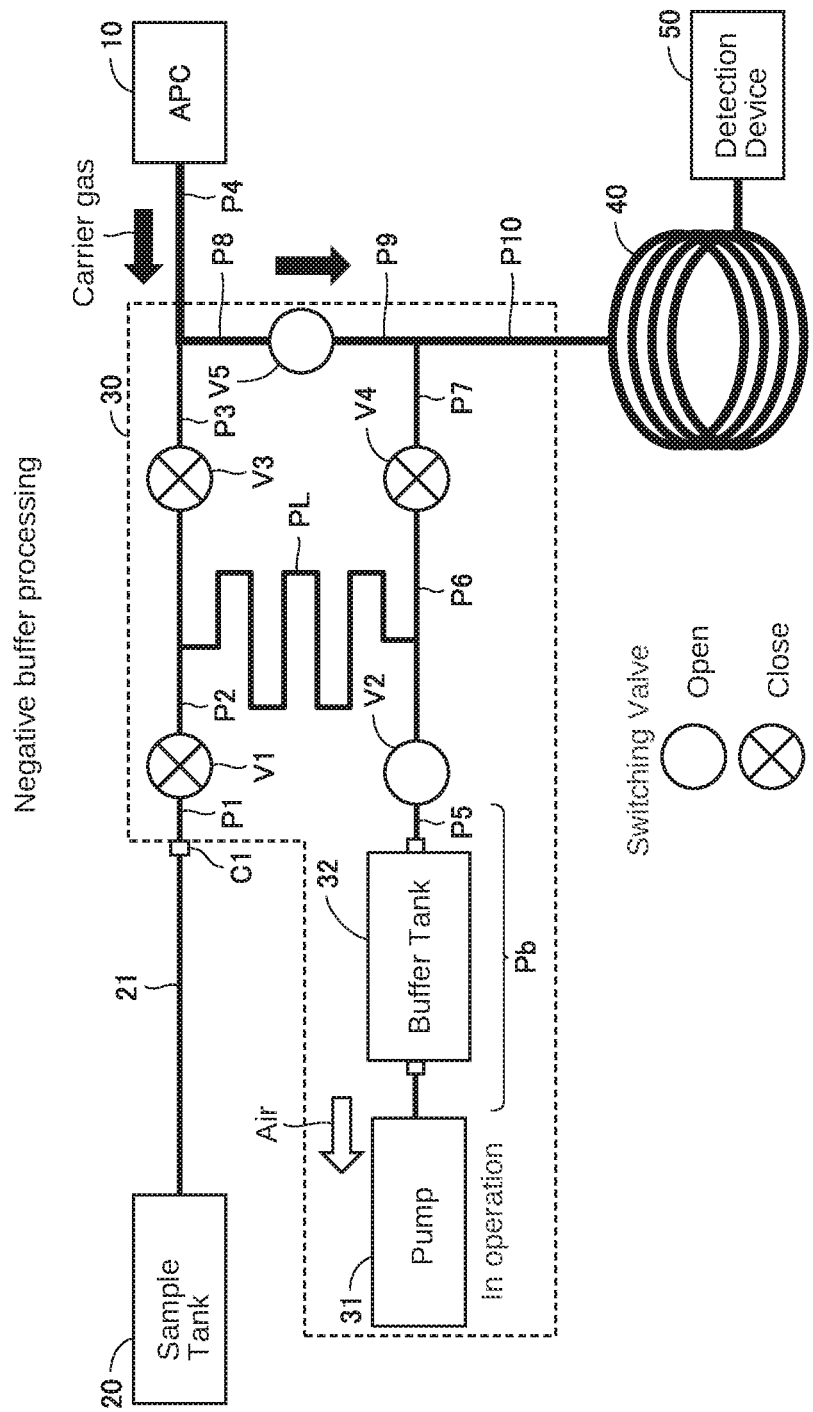
FIG. 2 is a (first) diagram showing a state of a gas sampler during negative pressure buffer processing.

FIG. 2 is a diagram showing the state of the gas sampler 30 during the negative pressure buffer processing. During the negative pressure buffer processing, the control device 100 makes the switching valves V1, V3, and V4 in a closed state and makes the switching valve V2 in an open state. With this, the sample loop PL and the pump 31 are communicated with each other, and the sample loop PL is disconnected from the sample tank 20, the APC10, and the column 40. In this state, the control device 100 activates the pump 31. With this, as shown by the outlined arrow, the air in the buffer flow path Pb and the sample loop PL is sucked out by the pump 31, and the inside of the buffer flow path Pb and the sample loop PL is set to a negative pressure.

Note that it is desirable to constantly fill the column 40 with a carrier gas, and therefore the switching valve V5 is kept in an open state during the negative pressure buffer processing. Thus, as indicated by the black arrows, the carrier gas from the APC 10 is supplied to the column 40 through the pipings P4, P8, P9, and P10 in this order.

Next, the sample filling processing will be described. The sample filling processing is for filling a sample gas into the sample loop PL by using the negative pressure in the buffer flow path Pb generated by the negative pressure buffer processing.

Figure 3:
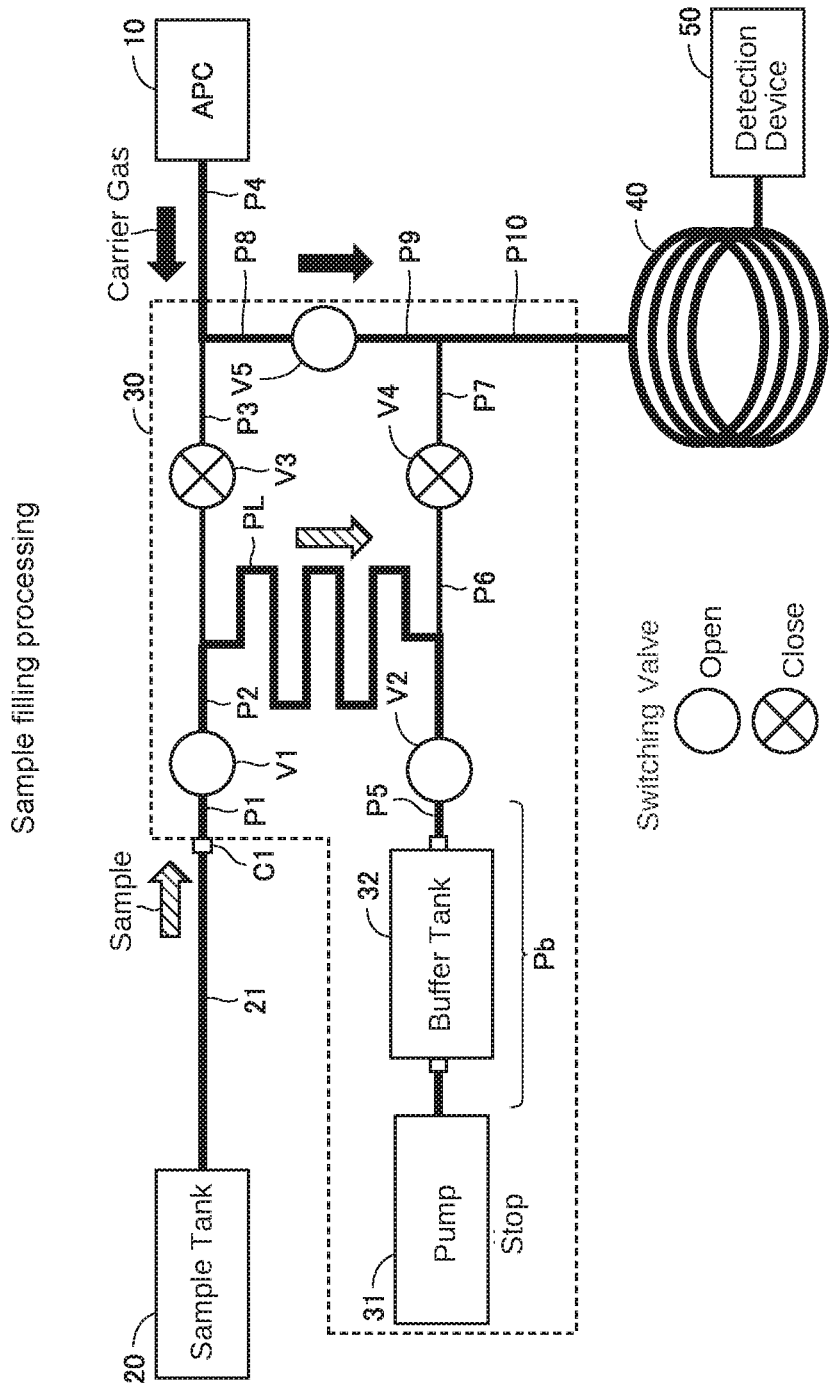
FIG. 3 is a diagram showing a state of a gas sampler during sample filling processing.

FIG. 3 is a diagram showing the state of the gas sampler 30 during the sample filling processing. During the sample filling processing, the control device 100 makes the switching valves V3 and V4 in a closed state and makes the switching valves V1 and V2 in an open state in a state in which the pump 31 is stopped. That is, in the state during the negative pressure buffer processing shown in FIG. 2 described above, the operating pump 31 is stopped and the switching valve V1 is switched from the closed state to the open state. This allows the sample tank 20 to be communicated to the sample loop PL and the buffer flow path Pb, so that the sample gas is filled from the sample tank 20 in the sample loop PL by the negative pressure of the buffer flow path Pb, as shown by the shaded arrows.

At this time, in this embodiment, the buffer tank 32 is selected so that the volume of the buffer flow path Pb becomes greater than the volume of the introduction piping 21 by a predetermined amount. Therefore, it is possible to suppress the shortage of the amount of the sample gas to be sucked into the sample loop PL.

Further, during the sample filling processing by this embodiment, the pump 31 is stopped. Therefore, it is possible to suppress wasteful consumption of the sample gas as compared with the case in which the sample gas is sucked in a state in which the pump 31 is being operated. That is, if the pump 31 is continuously operated, the sample gas is sucked also by the pump 31 and the sample gas is wastefully consumed. However, the pump 31 is stopped and therefore the sample gas is not sucked by the pump 31 during the sample filling processing by this embodiment, so that the wasteful consumption of the sample gas can be suppressed.

Further, since the sample gas will not be sucked by the pump 31 by stopping the pump 31, the amount of the sample gas filled in the sample loop PL by the sample filling processing can be determined by the sum of the volume of the sample loop PL and the volume of the buffer flow path Pb. In addition, stopping the pump 31 does not cause pulsations of the pump 31, which suppresses the generation of a pressure gradient in the sample loop PL, and therefore, a more appropriate analysis can be performed.

Note that, also during the sample filling processing, in the same manner as in the negative pressure buffer processing, the switching valve V5 is made in an open state, and the carrier gas from the APC 10 is supplied to the column 40 as indicated by the black arrows.

Next, the sample supply processing will be described. The sample supply processing is for supplying the sample gas filled in the sample loop PL by the sample filling processing to the column 40 by using a carrier gas.

Figure 4:
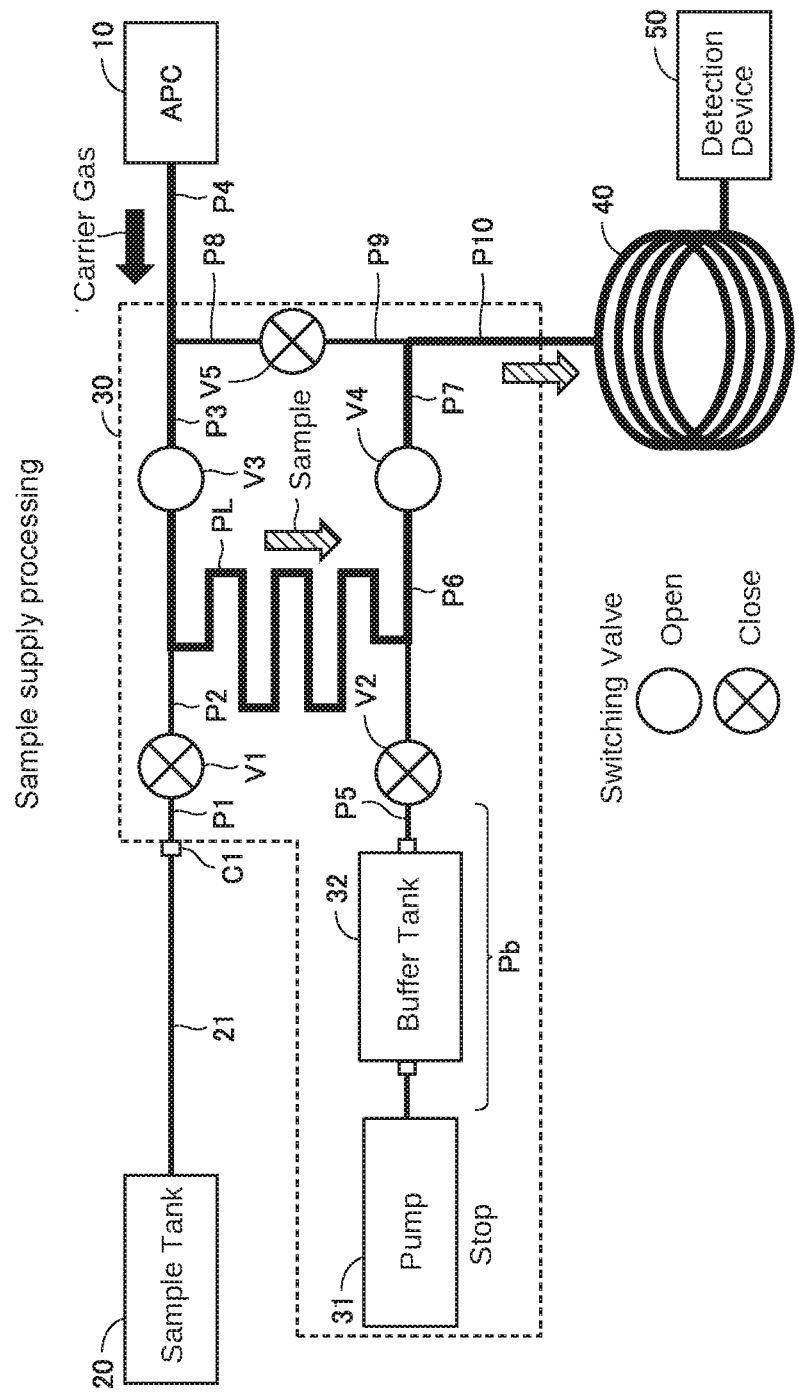
FIG. 4 is a diagram showing a state of a gas sampler during sample supply processing.

FIG. 4 is a diagram showing the state of the gas sampler 30 during the sample supply processing. During the sample supply processing, the control device 100 makes the switching valves V1, V2, and V5 in a closed state, and makes the switching valve V3 and V4 in an open state in a state in which the pump 31 is stopped. With this, the carrier gas from the APC 10 is supplied to the sample loop PL through the pipings P4, P3, and P2, so that the sample gas filled in the sample loop PL is pushed out by the carrier gas and supplied to the column 40 through the pipings P6, P7, and P10.

Figure 5:
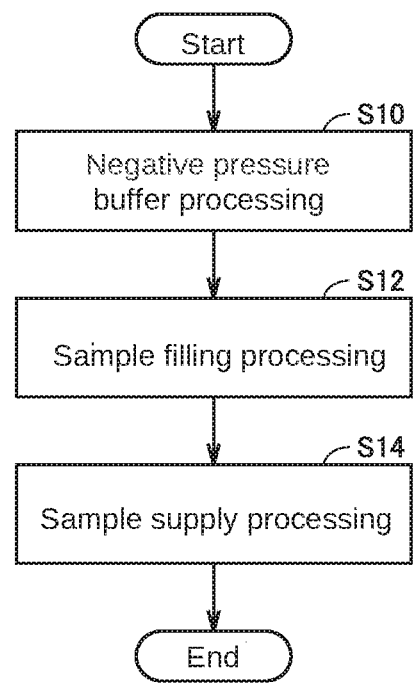
FIG. 5 is a (first) flowchart showing procedures performed by a control device.

FIG. 5 is a flowchart illustrating the procedure of the processing to be performed when the control device 100 supplies the sample gas from the gas sampler 30 to the column 40. This flowchart is initiated when a user performs an operation of requiring the supply of the sample gas to the input device 60. At the time when this flowchart is disclosed, the introduction piping 21 is connected to the connection portion C1 and the volume of the buffer flow path Pb is greater than the volume of the introduction piping 21 by a predetermined amount.

First, the control device 100 performs the above-described negative pressure buffer processing (Step S10). Specifically, as shown in FIG. 2, the control device 100 activates the pump 31 while making the switching valves V1, V3, and V4 in a closed state and making the switching valve V2 in an open state. With this, the inside of the buffer flow path Pb and sample loop PL is set to a negative pressure.

After executing the negative pressure buffer processing, the control device 100 executes the above-described sample filling processing (Step S12). More specifically, as shown in FIG. 3, while stopping the pump 31, the switching valves V3 and V4 are made in a closed state, and the switching valves V1 and V2 are made in an open state. As a result, the sample gas is filled from the sample tank 20 into the sample loop PL by the negative pressure of the buffer flow path Pb.

After executing the sample filling processing, the control device 100 executes the above-described sample supply processing (Step S14). Specifically, as shown in FIG. 4, the control device 100 makes the switching valves V1, V2, and V5 in a closed state and makes switching valves V3 and V4 in an open state while stopping the pump 31. As a result, the sample gas filled in the sample loop PL is supplied to the column 40.

It should be noted that the terms "negative pressure buffer processing", "sample filling processing", "sample supply processing" and "control device 100" in this embodiment correspond to "negative pressure processing", "introduction processing", "supply processing" and "control device" in the present disclosures, respectively.

As described above, in the gas sampler 30 of this embodiment, the piping P5 between the pump 31 and the sample loop PL is configured to be selectively connectable to any one of the plurality of buffer tanks 32a, 32b, 32c, . . . different in volume. This allows a user to make the volume of the buffer flow path Pb including the piping P5 and the buffer tank 32 greater than the volume of the introduction piping 21 by a predetermined amount by replacing the buffer tank 32 to be connected the piping P5 in accordance with the volume of the introduction piping 21 before initiating the negative buffer processing. Therefore, in the negative pressure buffer processing, a sufficient negative pressure corresponding to the volume of the introduction piping 21 can be generated in the buffer flow path Pb. Therefore, it is possible to suppress the shortage of the amount of the sample gas sucked into the sample loop PL in the subsequent sample filling processing.

Also, in the gas sampler 30 according to this embodiment, in the sample filling processing, in a state in which the pump 31 is stopped, the sample gas is filled in the sample loop PL by using the negative pressure of the buffer flow path Pb generated in the negative buffer processing (more precisely, the negative pressure of the buffer flow path Pb and the sample loop PL). For this reason, the amount of the sample gas filled in the sample loop PL is determined by the sum of the volume of the buffer flow path Pb and the volume of the sample loop PL. Therefore, by connecting a buffer tank 32 having a volume corresponding to the volume of the introduction piping 21 to the piping P5, wasteful consumption of the sample gas can be suppressed, which in turn can minimize the amount of the sample required for one analysis.

MODIFICATION

Modification 1

In the above-described embodiment, an example is described in which the negative pressure buffer processing is initiated in a state in which the volume of the buffer flow path Pb is greater than the volume of the introduction piping 21 by a predetermined amount (see FIG. 5).

However, in cases where the introduction piping 21 connected to the connection portion C1 is changed to change a sample gas, it is desirable to select a buffer tank 32 having a capacity suitable for the volume of the changed introduction piping 21 and connect the selected buffer tank 32 to the piping P5 again.

Therefore, before starting the negative pressure buffer processing, it may be modified to execute the processing for selecting a buffer tank 32 having a capacity suitable for the volume of the introduction piping 21 (hereinafter referred to also as "buffer tank selection processing").

Figure 6:
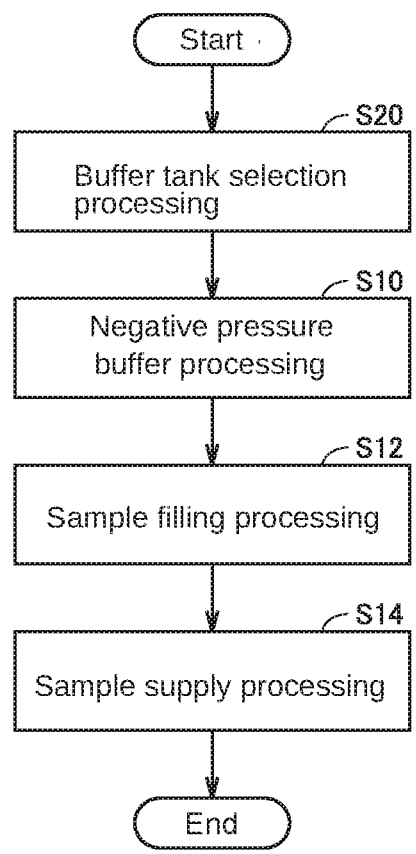
FIG. 6 is a (second) flowchart showing procedures performed by a control device.

FIG. 6 is a flowchart illustrating a procedure of the processing executed when the control device 100 according to Modification 1 supplies a sample gas from the gas sampler 30 to the column 40. This flowchart is initiated when a user operates the input device 60 to require supplying of the sample gas in a state in which the introduction piping 21 is connected to the connection portion C1.

The flowchart shown in FIG. 6 is obtained by adding Step S20 to the above-described flowchart shown in FIG. 5 before Step S10. The rest of Steps (Steps having the same numbers as those of Steps shown in FIG. 5) has been described above, and therefore the detailed descriptions thereof will not be repeated here.

In Step S20, the control device 100 executes the above-described buffer tank selection processing (Step S20). For example, the control device 100 executes the following processing as the buffer tank selection processing. First, the control device 100 makes the display device 70 to display the inquiry message which inquires the user whether or not the buffer tank selection processing is required.

When, in response to the inquiry message, the user enters an action indicating that the buffer tank selection processing is required into the input device 60, the control device 100 makes the display device 70 display the message that requires the user to input the amount of the capacity of the introduction piping 21 to be connected to the connection portion C1. In response to this message, when the user inputs the information indicating the capacity of the introduction piping 21 into the input device 60, the control device 100 selects a buffer tank 32 out of the plurality of buffer tanks 32a, 32b, 32c, . . . registered in the memory that matches the capacity of the introduction piping 21 input by the user, displays the information indicating the selected buffer tank 32 on the display device 70, and requests the user to exchange the buffer tank 32. In response to this request, when the user exchanges the buffer tank 32 and enters the operation indicating that the exchange has been completed into the input device 60, the control device 100 proceeds to Step S10 and the subsequent step.

On the other hand, in response to the inquiry message, when the user performs an operation indicating that buffer tank selection processing is unnecessary to the input device 60, the control device 100 proceeds to Step S10 or the subsequent step without performing the selection or the like of the buffer tank 32.

As described above, the control device 100 according to Modification 1 executes the above-described buffer tank selection processing before initiating the negative pressure buffer processing. In this buffer tank selection processing, the user can replace the buffer tank 32 to be connected to the piping P5 with a buffer tank 32 having a capacity appropriate to the volume of the introduction piping 21. Therefore, even in cases where, for example, the user changes the introduction piping 21 connected to the connection portion C1 to change a sample gas, a suitable amount of the sample gas can be supplied to the sample loop PL.

Modification 2

In the above-described embodiment, an example is described in which the inside of the buffer flow path Pb and the sample loop PL is set to a negative pressure in a state in which the switching valve V2 is in an open state during the negative buffer processing (see FIG. 2).

However, in cases where the volume of the buffer flow path Pb is sufficiently greater than the sum volume from the introduction piping 21 to the sample loop PL, it may be modified to set only the inside of the buffer flow path Pb to a negative pressure in a state in which the switching valve V2 is in a closed state during the negative pressure buffer processing.

Figure 7:
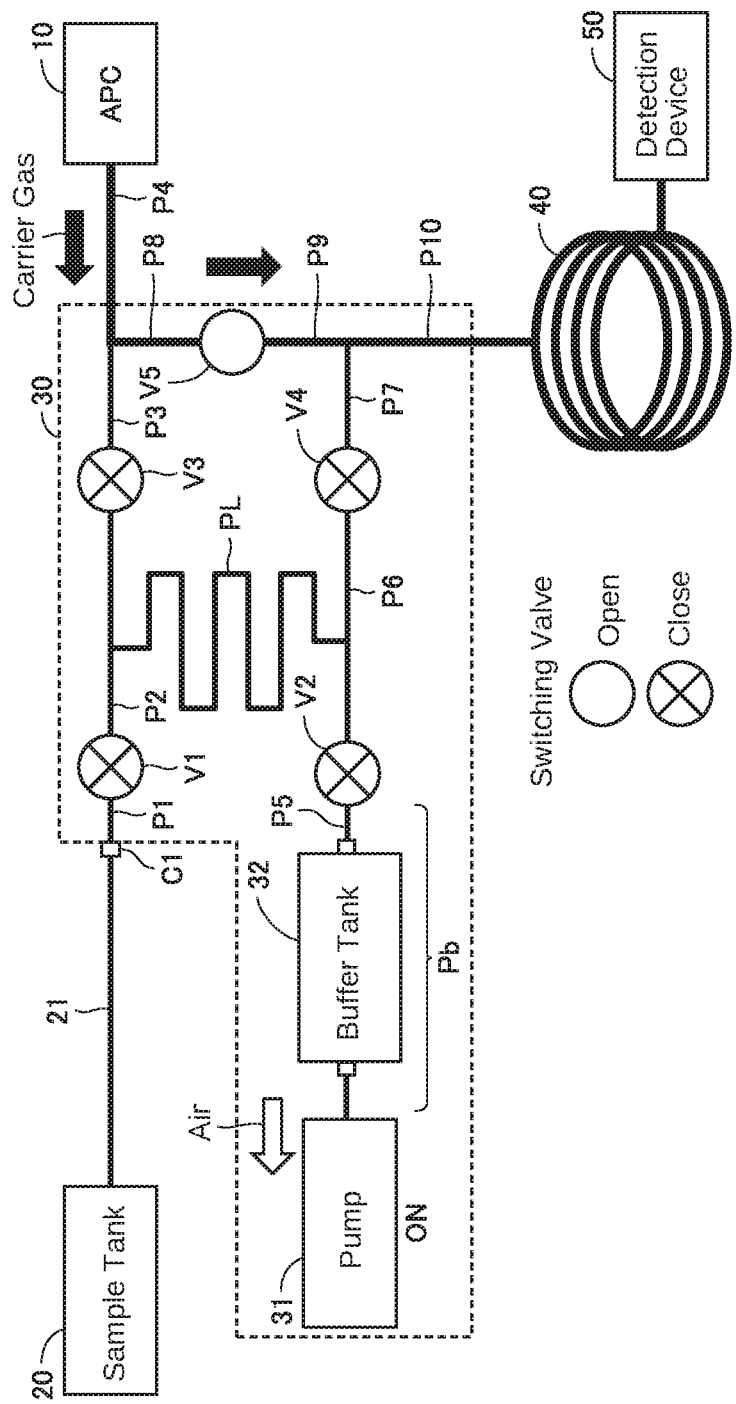
FIG. 7 is a (second) diagram showing a state of a gas sampler during negative pressure buffer processing.

FIG. 7 shows a state of a gas sampler 30 during the negative pressure buffer processing according to Modification 2. In Modification 2, during the negative pressure buffer processing, the control device 100 makes the switching valves V1 to V4 in a closed state and make only the switching valve V5 in an open state. With this, the sample loop PL is disconnected from the sample tank 20, the APC 10, the column 40, and the pump 31. In this state, the control device 100 activates the pump 31. As a result, the air in the buffer flow path Pb is sucked by the pump 31, and the inside of the buffer flow path Pb is set to a negative pressure as indicated by the outlined arrow.

In this manner, only the inside of the buffer flow path Pb may be set to a negative pressure during the negative pressure buffer processing. Even in this manner, in cases where the volume of the buffer flow path Pb is sufficiently greater than the sum volume from the introduction piping 21 to the sample loop PL, in the sample filling processing, the sufficient amount of the sample gas can be sucked by utilizing the negative pressure within the buffer flow path Pb.

Modification 3

In the above embodiments, an example is described in which the switching valves V1 to V5 each are pneumatic valves, but the switching valve V1 to V5 is not necessarily limited to a pneumatic valve, and may be an electromagnetic valve, for example.

Aspects

It will be understood by those skilled in the art that the above-described embodiment and the modifications thereof are illustrative of the following aspects.

(Item 1)

A gas supply method according to one aspect of the present invention is for supplying a sample gas to a column of a gas analyzer by using a gas sampler. The gas sampler includes a connection portion connectable to a sample tank filled with the sample gas, a sample holding portion configured to hold the sample gas introduced from the sample tank to the connection portion, a switching valve configured to switch a connection state between the connection portion and the sample holding portion, and a suction pump connected to the sample holding portion via a buffer flow path. A volume of the buffer flow path is greater than a volume of an introduction flow path connecting between the sample tank and the connection portion. The gas supply method includes the steps of: executing negative pressure processing for setting an inside of the buffer flow path to a negative pressure by operating the suction pump in a state in which the switching valve is in a closed state; and executing introduction processing for introducing the sample gas from the sample tank to the sample holding portion via the connection portion by making the switching valve in an open state in a state in which the suction pump is stopped, after executing the negative pressure processing.

According to the gas supply method as recited in the above-described Item 1, since the volume of the buffer flow path is greater than the volume of the introduction flow path, a sufficient negative pressure can be generated in the buffer flow path in the negative pressure processing. Therefore, it is possible to suppress the shortage of the amount of the sample gas sucked into the sample holding portion in the introduction processing after the negative pressure processing. In addition, in the introduction processing, since the suction pump is stopped, the sample gas is suppressed from being excessively sucked. Therefore, an appropriate amount of the sample gas can be introduced into the sample holding portion in the introduction processing. As a result, an appropriate amount of the sample gas can be accurately supplied to the column of the gas analyzer by using the gas sampler.

(Item 2)

In the gas supply method as recited in the above-described Item 1, the buffer flow path may be configured to be selectively connectable to any one of a plurality of buffer tanks different in volume. The gas supply method may further include a step of executing selection processing for selecting a buffer tank to be connected to the buffer flow path from the plurality of buffer flow paths according to the volume of the introduction flow path to be connected to the connection portion such that the volume of the buffer flow path becomes greater than the volume of the introduction flow path by a predetermined amount, before executing the negative pressure processing.

According to the gas supply method as recited in the above-described Item 2, the selection processing is performed before executing the negative pressure processing. In this selection processing, the user can replace the buffer tank connected to the buffer flow path with a buffer tank having a capacity appropriate to the volume of the introduction flow path. Thus, even in cases where, for example, the user changes the introduction flow path connected to the connection portion to change the sample gas, a suitable amount of the sample gas can be introduced into the sample holding portion.

(Item 3)

In the gas supply method as recited in the above-described Item 2, the gas supply method may further include the step of: executing supply processing for supplying the sample gas in the sample holding portion to the column, after executing the introduction processing.

According to the gas supply method as recited in the above-described Item 3, a suitable amount of the sample gas introduced to the sample holding portion in the introduction processing can be supplied to the column of the gas analyzer in the supply processing.

(Item 4)

A gas sampler according to one aspect of the present invention is for supplying a sample gas to a column of a gas analyzer, and includes a connection portion connectable to a sample tank filled with the sample gas, a sample holding portion configured to hold the sample gas introduced to the connection portion from the sample tank, and a switching valve configured to switch a connection state between the connection portion and the sample holding portion, and a suction pump connected to the sample holding portion via a buffer flow path. A volume of the buffer flow path is greater than a volume of an introduction flow path connecting the sample tank to the connection portion.

According to the gas sampler as recited in the above-described Item 4, the volume of the buffer flow path is greater than the volume of the introduction flow path. Thus, in cases where as a method of filling the sample holding portion, a method in which the inside of the buffer flow path is set to a negative pressure by using the suction pump and the sample gas is sucked into the sample holding portion using the negative pressure is used, a sufficient negative pressure can be generated in the buffer flow path, so that the sample gas can be sucked into the sample holding portion by using the negative pressure. Therefore, it is possible to suppress the shortage of the amount of the sample gas sucked into the sample holding portion. As a result, an appropriate amount of the sample gas can be accurately supplied to the column of the gas analyzer by using the gas sampler.

(Item 5)

According to the gas sampler as recited in the above-described Item 4, the buffer flow path may be configured to be selectively connectable to any one of a plurality of buffer tanks different in volume.

According to the gas sampler as recited in the above-described Item 5, the user can replace the buffer tank connected to the buffer flow path with a buffer tank having a capacity suitable for the volume of the introduction flow path. Thus, even in cases where, for example, the user changes the introduction flow path connected to the connection portion to change the sample gas, a suitable amount of the sample gas can be introduced into the sample holding portion.

(Item 6)

The gas sampler as recited in the above-described Item 5, the gas sample may further include a control device configured to control the suction pump and the switching valve. It may be configured such that the control device executes negative pressure processing by operating the suction pump to set an inside of the buffer flow path to a negative pressure in a state in which the switching valve is in a closed state and introduction processing for introducing the sample gas from the sample tank to the sample holding portion via the connection portion by making the switching valve in an open state in a state in which the suction pump is stopped, after executing the negative pressure processing.

According to the gas sampler as recited in the above-described Item 6, since the volume of the buffer flow path is greater than the volume of the introduction flow path by a predetermined amount, a sufficient negative pressure can be generated in the buffer flow path in the negative pressure processing. Therefore, it is possible to suppress the shortage of the amount of the sample gas sucked into the sample holding portion in the filling processing after the negative pressure processing. In addition, in the filling processing, since the suction pump is stopped, the sample gas is suppressed from being excessively sucked.

(Item 7)

The gas sampler as recited in the above-described Item 6, the control device may execute selection processing for selecting a buffer tank to be connected to the buffer flow path from the plurality of buffer tanks according to the volume of the introduction flow path to be connected to the connection portion such that the volume of the buffer flow path becomes greater than the volume of the introduction flow path by a predetermined amount, before executing the negative pressure processing.

According to the gas sampler as recited in the above-described Item 7, the selection processing is executed before executing the negative pressure processing. In this selection processing, the user can replace the buffer tank connected to the buffer flow path Pb with a buffer tank having a capacity appropriate to the volume of the introduction flow path. Thus, even in cases where, for example, the user changes the introduction flow path connected to the connection portion to change the sample gas, a suitable amount of the sample gas can be introduced into the sample holding portion.

(Item 8)

In the gas sampler as recited in the above-described Item 6 or 7, the control device may execute supply processing for supplying the sample gas in the sample holding portion to the column, after executing the introduction processing.

According to the gas sampler as recited in the above-described Item 8, the suitable amount of the sample gas introduced into the sample holding portion in the filling processing can be supplied to the column of the gas analyzer in the supply processing.

Although some embodiments of the present invention have been described, the embodiments disclosed herein are to be considered in all respects as illustrative and not restrictive. The scope of the present invention is indicated by claims, and it is intended to include all modifications within the meanings and ranges equivalent to those of the claims.

The invention claimed is:

1. A gas supply method for supplying a sample gas to a column of a gas analyzer by using a gas sampler, the gas sampler including a connection portion connectable, via an introduction flow path, to a sample tank filled with the sample gas, a sample holding portion arranged to accommodate the sample gas introduced from the sample tank to the connection portion, a switching valve configured to change a connection between the connection portion and the sample holding portion, and a suction pump connected to the sample holding portion via a buffer flow path, wherein a volume of the buffer flow path is greater than a volume of the introduction flow path, the gas supply method comprising:

adjusting a pressure of an inside of the buffer flow path to a negative pressure by operating the suction pump in a state in which the switching valve is in a closed state; and introducing the sample gas from the sample tank to the sample holding portion via the connection portion by opening the switching valve with the suction pump being stopped, after the adjusting of the pressure.

2. The gas supply method as recited in claim 1, wherein the buffer flow path is configured to be selectively connectable to any one of a plurality of buffer tanks different in volume, and wherein the gas supply method further comprises the step of:

selecting a buffer tank to be connected to the buffer flow path from the plurality of buffer tanks according to the volume of the introduction flow path to be connected to the connection portion such that the volume of the buffer flow path becomes greater than the volume of the introduction flow path by a predetermined amount, before the adjusting of the pressure of the inside of the buffer flow path.

3. The gas supply method as recited in claim 2, further comprising the step of:

supplying the sample gas in the sample holding portion to the column, after the introducing of the sample gas.

4. A gas sampler for supplying a sample gas to a column of a gas analyzer, comprising:

a connection portion connectable, via an introduction flow path, to a sample tank filled with the sample gas;

a sample holding portion configured to hold the sample gas introduced to the connection portion from the sample tank;

a switching valve configured to switch a connection state between the connection portion and the sample holding portion;

a suction pump connected to the sample holding portion via a buffer flow path; and a control device configured to control the suction pump and the switching valve, wherein a volume of the buffer flow path is greater than a volume of the introduction flow path connecting between the sample tank and the connection portion, wherein the buffer flow path is configured to be selectively connectable to any one of a plurality of buffer tanks different in volume, and wherein the control device executes negative pressure processing by operating the suction pump to set an inside of the buffer flow path to a negative pressure in a state in which the switching valve is in a closed state, and introduction processing for introducing the sample gas from the sample tank to the sample holding portion via the connection portion by making the switching valve in an open state in a state in which the suction pump is stopped, after executing the negative pressure processing.

5. The gas sampler as recited in claim 4, wherein the control device executes selection processing for selecting a buffer tank to be connected to the buffer flow path from the plurality of buffer tanks according to the volume of the introduction flow path to be connected to the connection portion such that the volume of the buffer flow path becomes greater than the volume of the introduction flow path by a predetermined amount, before executing the negative pressure processing.

6. The gas sampler as recited in claim 4, wherein the control device executes supply processing for supplying the sample gas in the sample holding portion to the column, after executing the introduction processing.

7. A gas sampler for supplying a sample gas to a column of a gas analyzer, comprising:

a connection portion connectable, via an introduction flow path, to a sample tank filled with the sample gas;

a sample holding portion configured to hold the sample gas introduced to the connection portion from the sample tank;

a switching valve configured to switch a connection state between the connection portion and the sample holding portion; and a suction pump connected to the sample holding portion via a buffer flow path, wherein a volume of the buffer flow path is greater than a volume of the introduction flow path connecting between the sample tank and the connection portion, and wherein the buffer flow path is configured to be selectively connectable to any one of a plurality of buffer tanks different in volume.

* * * * *